United States Patent [19]

Spaulding

[11] E Patent Number: Re. 31,742

[45] Reissued Date of Patent: Nov. 20, 1984

[54] UNITARY HOODED ELECTRICAL CONTACT

[75] Inventor: Tedford H. Spaulding, Norridge, Ill.

[73] Assignee: Allied Corporation, Morris Township, Morris County, N.J.

[21] Appl. No.: 479,594

[22] Filed: Mar. 28, 1983

Related U.S. Patent Documents

Reissue of:

[64] Patent No.: 4,136,923
Issued: Jan. 30, 1979
Appl. No.: 842,185
Filed: Oct. 14, 1977

[51] Int. Cl.[3] ..... H01R 13/12

[52] U.S. Cl. ..... 339/258 R

[58] Field of Search ..... 339/256 R, 258 R, 258 P

[56] References Cited

U.S. PATENT DOCUMENTS

| | | | |
|---|---|---|---|
| 1,194,122 | 8/1916 | Ball | 339/258 R |
| 2,385,915 | 3/1944 | Hagedorn et al. | 339/258 |
| 2,813,257 | 11/1957 | Cornell | 339/258 |
| 3,125,396 | 3/1964 | Bertram | 339/258 R |
| 3,426,320 | 2/1969 | Wilm | 339/258 R |
| 3,538,491 | 11/1970 | Logenecker et al. | 339/256 R |
| 3,621,445 | 11/1971 | Horecky | 339/256 R |
| 3,654,595 | 4/1972 | Curr | 339/256 R |
| 3,721,943 | 3/1973 | Curr | 339/258 P |
| 3,786,401 | 1/1974 | Jones et al. | 339/258 R |
| 3,963,302 | 6/1976 | Gourley | 339/258 R |
| 4,068,917 | 1/1978 | Seidler | 339/258 R |

FOREIGN PATENT DOCUMENTS

| | | |
|---|---|---|
| 2012966 | 3/1970 | France . |
| 2157490 | 6/1973 | France . |

*Primary Examiner*—Joseph H. McGlynn
*Attorney, Agent, or Firm*—William Lohff; F. M. Arbuckle; James P. DeClercq

[57] ABSTRACT

An electrical contact is disclosed which is formed from a single, integral piece of sheet metal and includes an active contact element, a terminal element and a hood. The hood covers at least the active contact element to protect the pin-engaging tines formed integrally therewith from inadvertant distortion or breakage.

16 Claims, 25 Drawing Figures

UNITARY HOODED ELECTRICAL CONTACT

Matter enclosed in heavy brackets [ ] appears in the original patent but forms no part of this reissue specification; matter printed in italics indicates the additions made by reissue.

BACKGROUND OF THE INVENTION

The present invention relates generally to electrical contacts and, more particularly, to a one-piece electrical contact fabricated from a single, integral piece of sheet metal. The contacts of the present invention may be characterized as hooded, socket contacts which are adapted to receive a compatible mating pin contact and are typically used in a variety of different electrical connector assemblies.

For several years demand has been increasing in the transportation, communication and data processing industries for electrical connectors capable of withstanding severe environmental conditions while retaining or even improving their serviceability. In response to this demand, a variety of connectors have been developed having means to effectively seal the contacts within the connector shell while still enabling removal and reinstallation of an individual contact should maintenance of the connector so require. One approach to this problem has been to seal the rearward or conductor-receiving end of the connector components with an elastomeric grommet, the individual contacts being forced through restrictive apertures in the grommet during installation or removal. Typical examples of such connectors are illustrated in U.S. Pat. Nos. 3,336,569; 3,512,119; 3,786,397; and 3,960,428. One of the disadvantages attendant to the use of these connectors is that the contacts may be damaged during installation, or alternatively, the grommet might be cut or torn, impairing the quality of the seal obtained. This is particularly troublesome with socket contacts having small resilient fingers or tines stamped from the body of the socket.

In addition, increasing demands have been made to reduce the size of these electrical connectors and therefore, the contacts used in them are correspondingly small and subject to damage during handling and installation.

In order to overcome these problems, the contacts used in these connectors, and particularly the socket contacts, have been provided with hoods to protect the active contact element of the contact, i.e., the tines, from damage during handling and installation. The hood also prevents inadvertant displacement of the active contact element beyond its elastic limits which would require replacement of the contact.

The conventional hooded contact known in the art is constructed from at least two pieces, one being the contact itself which may be fabricated from sheet metal stock and the other being the hood which is generally fabricated by center milling a suitably sized bar stock on a screw machine. Of course, this dual fabricating process is not only time consuming and expensive, but it requires assembly of the components after fabrication which further increases labor costs.

SUMMARY OF THE INVENTION

Accordingly, the present invention is directed to an electrical contact for use in a connector assembly which provides all the advantages of conventional multi-component hooded contacts without engendering the attendant disadvantages of increased manufacturing time and costs. The contact is fabricated by stamping and forming operations from a single, integral piece of sheet metal and includes an active contact element for electrically engaging a compatible pin contact, a terminal element for receiving and terminating an electrical conductor, and hood means for housing and protecting the active contact element. Thus, the fragile components of even very small socket contacts are fully protected during shipment, installation and while in use within the connector. The hold also includes an outer surface which is relatively smooth and free of edges which might cut or tear the connector seals or grommets.

A principal feature of the present invention, therefore, is the provision of a one-piece hooded contact fabricated from a single, integral piece of sheet metal.

Another feature of the present invention is the provision of a one-piece hooded socket contact with a crimp-type terminal element having positive conductor locating and visual inspection means.

Still another feature of the present invention is the provision of a one-piece hooded socket contact having access apertures in the hood to permit inspection and presetting of the tines of the active contact element.

A further feature of the present invention is the ability to mass produce a contact at low cost and increased production rates which meets the performance requirements and specifications prevalent in the connector industry at this time.

Another feature of the invention is the provision of a one-piece hooded socket contact free of external grommet cutting edges.

BRIEF DESCRIPTION OF THE DRAWINGS

The novel features that are believed to be characteristic of the invention are set forth in the appended claims. The invention itself, however, together with further objects and and attendant advantages thereof, will be best understood by reference to the following description taken in connection with the accompanying drawings in which:

DETAILED DESCRIPTION OF THE PREFERRED EMBODIMENTS

Figure 1:
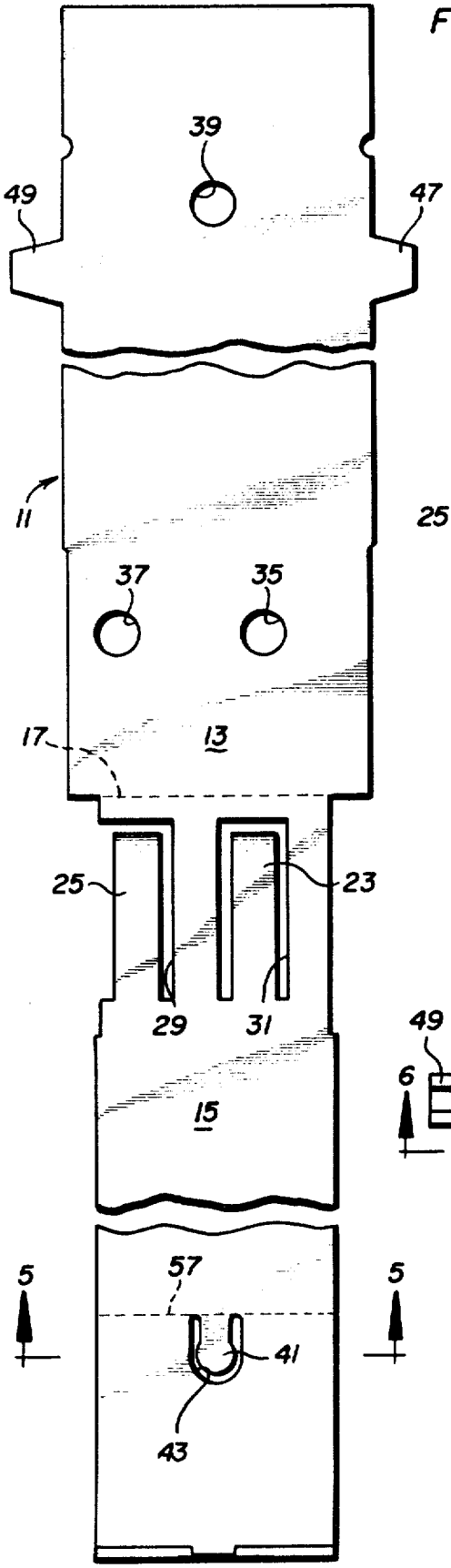
FIG. 1 is a top plan view of a single integral sheet metal blank from which the hooded socket contact comprising a first preferred embodiment of the present invention is formed.

Referring now to FIGS. 1 through 11 of the drawings, a first preferred embodiment of a one-piece hooded socket contact 10 for an electrical connector assembly is shown at various stages of fabrication from a one-piece sheet metal blank. In this embodiment, the single, integral contact blank 11 comprises a first rectangular portion, identified generally at 13, which forms the outer hood or shell of the socket contact shown in FIG. 4, and a second, narrower rectangular portion, identified generally at 15, which forms an inner liner. For purposes of illustration, a dashed line 17 is shown in FIG. 1 to define the juncture between the hood portion 13 and the liner portion 15.

Figure 2:
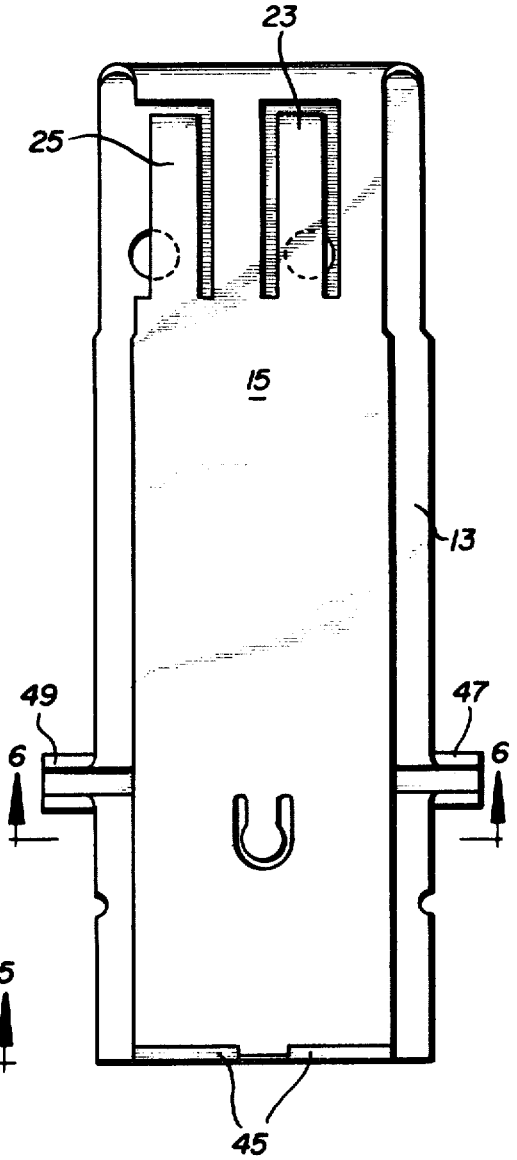
FIG. 2 is a top plan view of the one-piece blank shown in FIG. 1 after the blank has been folded during an early stage in forming operation.
Figure 3:
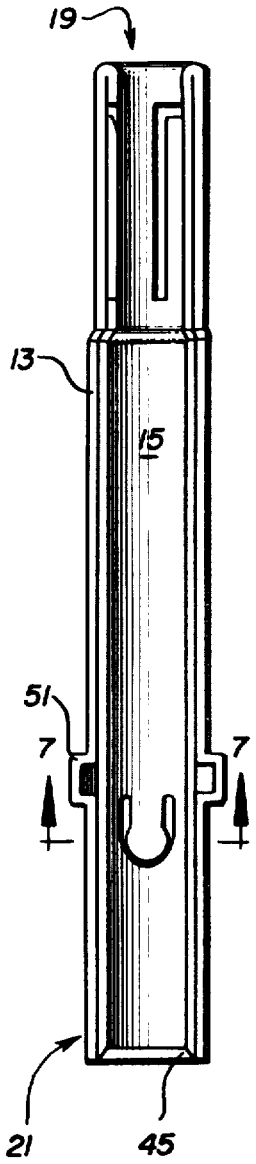
FIG. 3 is a top plan view of the folded one-piece blank shown in FIG. 2 illustrating an intermediate stage wherein the blank is being rolled into a tubular socket contact.
Figure 4:
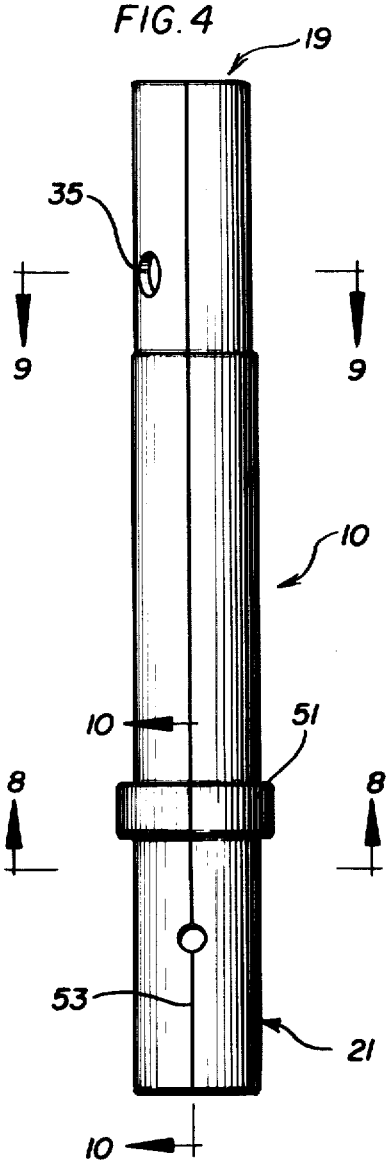
FIG. 4 is a top plan view showing the one-piece hooded electrical socket contact of the first preferred embodiment of the present invention which is formed from the blank shown in FIG. 1.
Figure 5:
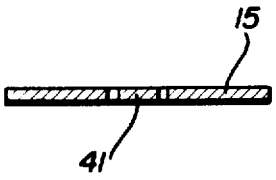
FIG. 5 is a cross-sectional view taken along lines 5—5 in FIG. 1.
Figure 6:
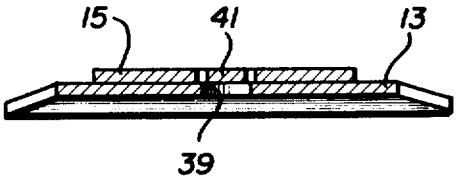
FIG. 6 is a cross-sectional view taken along lines 6—6 in FIG. 2.
Figure 7:
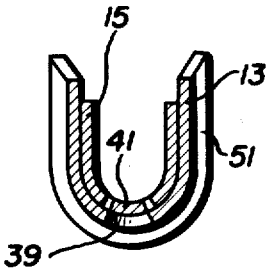
FIG. 7 is a cross-sectional view taken along lines 7—7 in FIG. 3.
Figure 8:
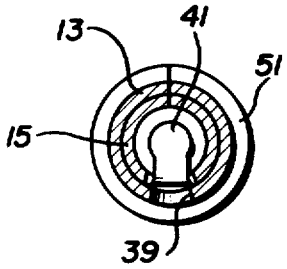
FIG. 8 is a cross-sectional view taken along lines 8—8 in FIG. 4.
Figure 9:
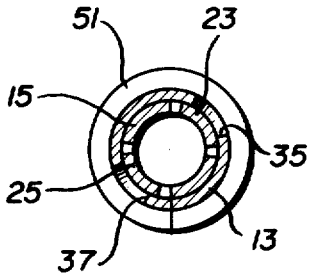
FIG. 9 is a cross-sectional view taken along lines 9—9 in FIG. 4.
Figure 10:
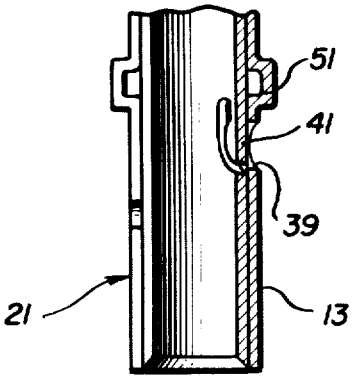
FIG. 10 is a fragmented sectional view taken along lines 10—10 in FIG. 4 and showing in greater detail a preferred terminal element structure.

As hereinafter described in greater detail, the socket contact 10 shown in FIG. 4 is formed from the contact blank 11 by first folding the blank, as illustrated in FIG. 2, until the hood portion 13 and the linear portion 15 are juxtaposed and then, in a subsequent operation as illustrated in FIG. 3, rolling the folded blank into a tubular configuration.

The socket contact 10 shown in FIG. 4 includes a pin contact receiving end, identified generally at 19, and a conductor terminating end, identified generally at 21. Tines 23 and 25 are provided at the forward, or pin-receiving, end of the liner portion 15 and together comprise the active contact element of the contact, in that these components resiliently engage a compatible pin contact of a mating connector body and are also the only components of the contact which move in the normal operation of the connector. The tines 23 and 25 are defined by slots 27 and 29, respectively, stamped in the blank 11 and extend forwardly within the contact 10 toward the pin-receiving end 19. A precious metal such as gold may be deposited or otherwise provided in a strip across the blank 11 on the inner surfaces of the tines 23 and 25. Alternatively, the entire liner portions 15 may be plated with the precious metal prior to the forming operations.

Apertures 35 and 37 in the hood portion 13 are located such that when the blank 11 is folded and rolled into the tubular contact socket the apertures are coincident with the tines 23 and 25. These apertures provide access through the hood of the socket contact to the tines to permit the tines to be set or pushed inwardly to thereby exert the requisite pressure on a pin contact inserted into the pin-receiving end of the socket contact.

A preferred terminal end used in conjuction with the hooded socket contact 10 is a closed crimp barrel as illustrated in FIGS. 1-11. Since the hood portion 13 and the liner portion 15 are of generally equal length in this embodiment the terminal end 21 is, in effect, a double-walled crimp barrel.

Figure 11:
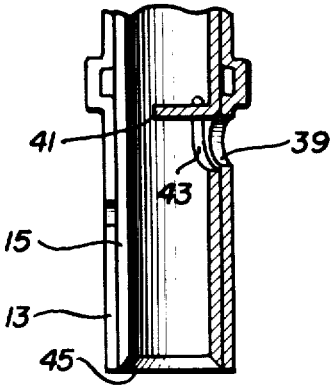
FIG. 11 is the view shown in FIG. 10 with the wire locating member disposed in the terminal element of the contact in the final operative position.

An aperture 39 in the hood portion 15 overlies a tab 41 in the liner portion 15 when the blank 11 is formed into the contact 10. The aperture 39 permits the tab 41 to be bent inwardly as shown in FIG. 11 to form a stop against which the conductor will abut as it is inserted into the terminal end 21. An aperture 43 is formed in the liner portion when the tab 41 is bent inwardly and is aligned with the aperture 39 in the hood portion. Accordingly, the conductor is visible within the terminal element to allow inspection to ascertain whether the conductor is properly seated therein against the stop tab 41. The inner surface 45 of the outer end of the liner portion is beveled, thereby permitting the smooth insertion of the wire conductor in the crimp barrel 21 and eliminating any sharp edges which might otherwise cut or score the conductor. A standard crimping machine may be used to crimp the closed crimp barrel so that the conductor is firmly interconnected both electrically and mechanically to the contact 10.

As illustrated in the drawings, to conform the contour of the socket contact 10 to the dimensions of the insert cavity in which the contact is located in the connector assembly, the width of the blank 11 is correspondingly varied. That is, where a smaller diameter is required, the width of the blank is correspondingly decreased. It follows, therefore, that the width along the corresponding section of the liner portion 15 underlying the hood portion 13 must be decreased to follow the contour of the hood portion. Moreover, it can be seen in FIG. 2 that the liner portion 15 is [substnatially] *substantially* narrower than the hood portion 13 so that the respective edges of the liner portions 15 will abut without overlapping, as will the respective edges of the hood portion 13, when the folded blank is rolled into the completed socket contact.

Flanges 47 and 49 may be included on opposite sides of the hood portion 13 to provide an optional retaining shoulder 51 when the socket contact is formed. The retaining shoulder 51, best seen in FIG. 4, allows the socket contact to be used with existing connectors wherein a retaining shoulder is necessary to releasably mount the socket contact in the pocket of the connector body. Thus, during an early stage in the manufacture of the socket contact, a U-shaped ridge 51 is embossed across the hood portion 13 in alignment with the retaining shoulder flanges 47 and 49. When the blank is subsequently folded, as illustrated in FIG. 2, and then rolled to form the tubular contact as illustrated in FIGS. 3 and 4, the retaining shoulder 51 is formed.

Accordingly, the hooded socket contact of the embodiment shown in FIGS. 1–11 includes full-length liner within the hood and which has integral tines extending forwardly toward the pin contact receiving end. The hood not only protects the tines but also prevents the entry of oversized pin contacts in the socket contact.

When the barrel 21 is crimped to terminate the conductor in the socket contact 10, the edges of the crimp barrel may be displaced as the crimp barrel is distorted. Accordingly, when the contact is to be inserted into a connector member or if it subsequently becomes necessary to remove the contact from the connector member, the standard tool commonly used to insert and withdraw the contact from the connector member may not fit over the crimp barrel 21 of the contact. Thus, the edges of the hood portion 13 may be welded, as indicated at 53, to prevent the displacement of the hood portion edges from their normal abutting relationship. It may also be desirable to form the blank 11 such that the seam of the hood portion is circumferentially displaced from the seam of the liner portion to expedite the welding operation.

Figure 12:
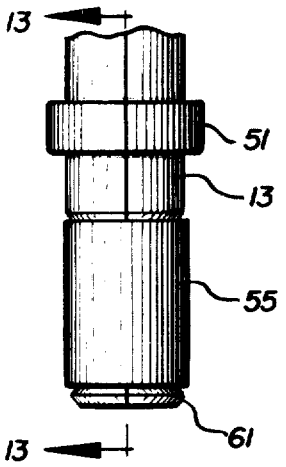
FIG. 12 is a fragmented top plan view of an alternative embodiment of the socket contact shown in FIG. 4 wherein a tubular sleeve is employed as a part of the terminal element of the contact.
Figure 13:
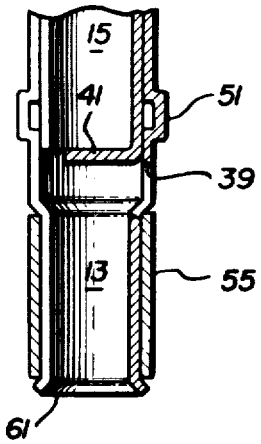
FIG. 13 is a fragmented sectional view taken along lines 13—13 in FIG. 12.

Undesirable deformation of the closed crimp barrel of the socket contact may be avoided without welding by utilization of a sleeve 55 coaxially mounted on the crimp barrel as illustrated in FIGS. 12 and 13. There, the liner portion is shortened as indicated by dashed line 57 in FIG. 1, and the hood portion 13 of the blank is narrowed to reduce the diameter of the contact along the portion of the crimp barrel identified generally at 59. The tubular sleeve 55 is slipped onto the crimp barrel 21 of the contact 10, and after the sleeve is seated on the crimp barrel portion 59, the end of the crimp barrel is flared, as illustrated at 61, to prevent its accidental removal.

Figure 14:
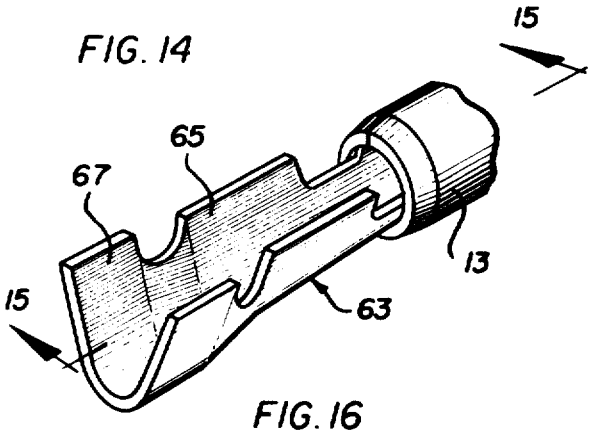
FIG. 14 is a fragmented partial perspective view of another alternative embodiment of the socket contact shown in FIG. 4 illustrating another terminal element of the contact.
Figure 15:
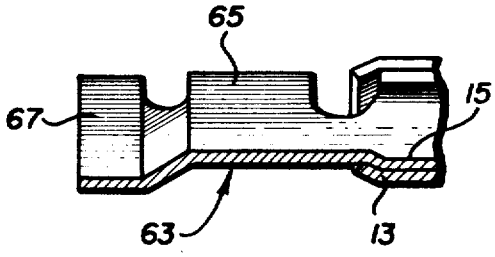
FIG. 15 is a sectional view taken along lines 15—15 in FIG. 14.
Figure 16:
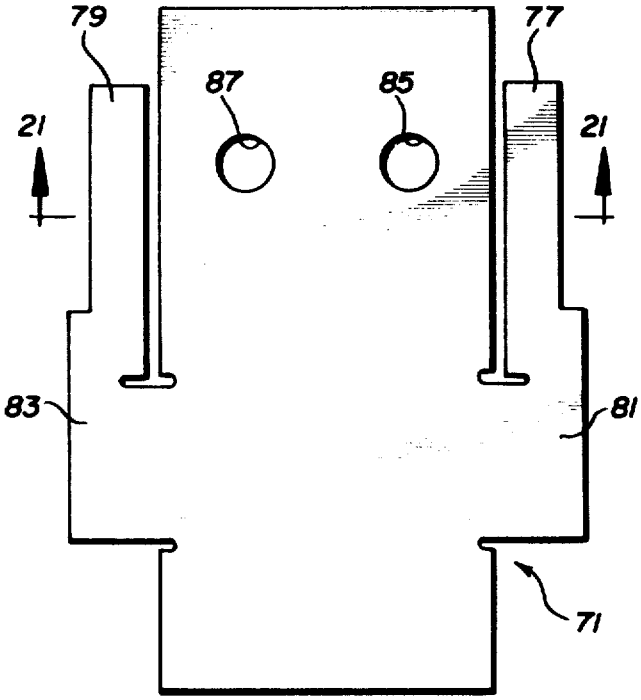
FIG. 16 is a top plan view showing a one-piece sheet metal blank used in fabricating a socket contact in accordance with another preferred embodiment of the present invention.
Figure 17:
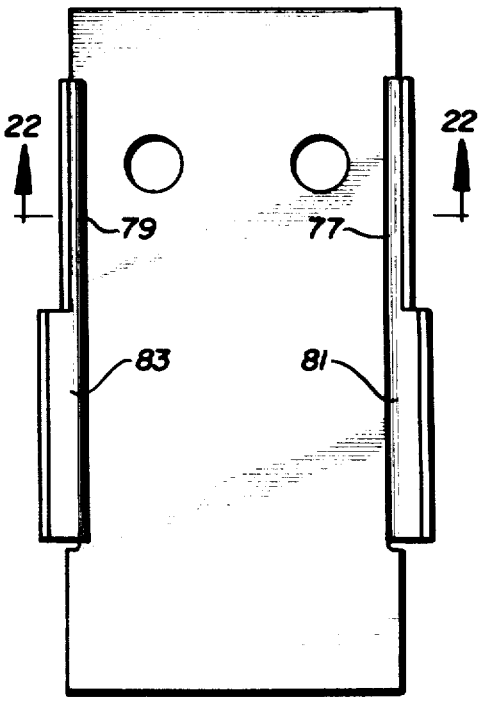
FIG. 17 is a top plan view illustrating an early stage of the forming operation in which the tines of the active contact element are arcuate in shape and bent upwardly from the portion of the blank comprising the hood of the completed tubular socket contact.

In another embodiment illustrated in FIGS. 14 and 15, the liner portion 15 extends beyond the hood portion 13 forming an open crimp barrel 63 at the terminal end of the contact 10. In particular, the cross-section of the open crimp structure 63 is generally U-shaped before being crimped onto the conductor and is formed as an integral portion of the liner 15. The structure 63 may also include a first portion 65 for engaging the bare conductor to make electrical contact therewith and a second outer portion 67 for engaging and holding the insulation to provide strain relief.

Another preferred embodiment of the present invention is illustrated in FIGS. 16 through 25, inclusive. The particular embodiment of the socket contact shown therein is also formed from a one-piece blank 71, but the blank is rolled, without lengthwise folding, to form the hooded contact. More particularly, the contact 70 formed from the contact. More particularly, the contact 70 formed from the blank 71 comprises a hood 72 having a forward pin-receiving portion 73 and rearwardly-disposed wire-engaging crimp barrel 75. Tines 77 and 79 are spaced from the sides of the blank along the forward pin-engaging portion 73 thereof in the forward direction, the rear or base ends of the lines being coupled to the liner portion 80 which is formed from flange portions, identified generally at 81 and 83.

Figure 18:
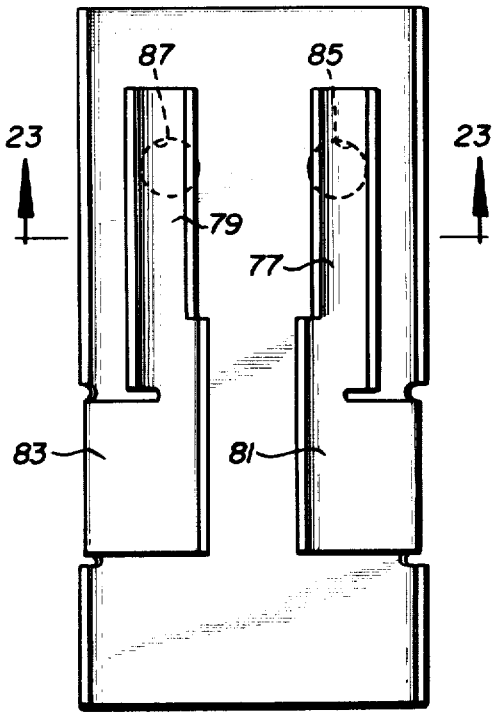
FIG. 18 illustrates an intermediate stage of the forming operation.
Figure 19:
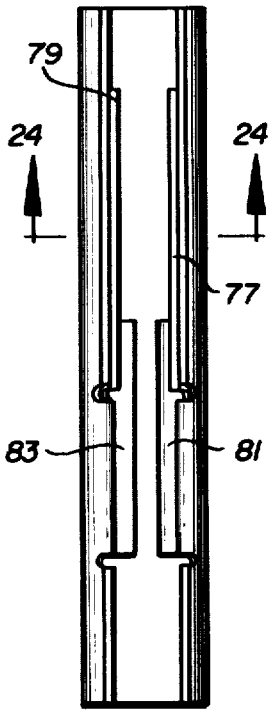
FIG. 19 illustrates a later stage of the forming operation wherein the blank shown in FIG. 16 is being formed into a tubular configuration.
Figure 23:
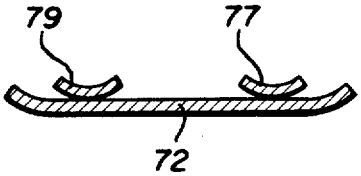
FIG. 23 is a cross-sectional view taken along lines 23—23 in FIG. 18
Figure 24:
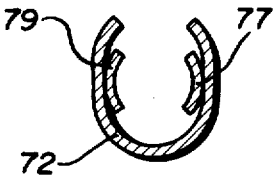
FIG. 24 is a cross-sectional view taken along lines 24—24 in FIG. 19.

The contact is assembled as illustrated in FIGS. 17 through 25 by first bending the flange portions 81 and 83 upwardly so that the tines 77 and 79 are above the remainder of the blank 71 at substantially right angles with respect to the hood portion 72 of the blank. The tines 77 and 79 are then rolled to have an inwardly directed arcuate shape and bent over the blank 71 until the contact tines 77 and 79 and flanges 81 and 83 rest adjacent the upper surface of the hood portion 72, as shown in FIGS. 18 and 23. The blank 71 is then rolled as illustrated in FIG. 19 and the cross-sectional view of FIG. 24, until finally, the blank 71 is rolled into the substantially tubular contact member 70 shown in FIGS. 20 and 25.

Figure 20:
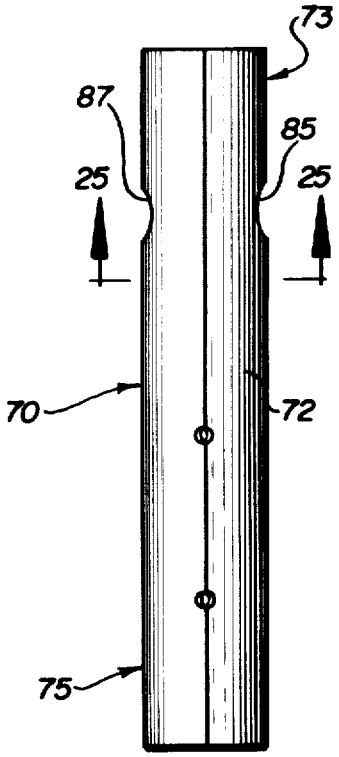
FIG. 20 is a top plan view showing the completed socket contact formed from the one-piece blank shown in FIG. 16.
Figure 21:
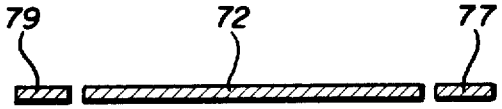
FIG. 21 is a cross-sectional view taken along lines 21—21 in FIG. 16.
Figure 22:
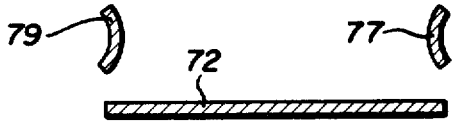
FIG. 22 is a cross-sectional view taken along lines 22—22 in FIG. 17.
Figure 25:
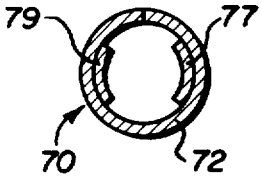
FIG. 25 is a cross-sectional view taken along lines 25—25 in FIG. 20.

The completed socket contact 70 shown in FIGS. 20 and 25 comprises an outer hood 72 and a liner portion having a pair of forwardly directed tines 77 and 79 for engaging a corresponding pin contact member in the forward pin-receiving portion 73. Apertures 85 and 87 in the forward portion of the hood are initially located in the blank 71 to be aligned with the tines 77 and 79, respectively, in the fabricated socket contact 70. The tines 77 and 79 are thereby accessible through the corresponding aperture 85 or 87 to be set or bent for engagement with a given pin contact.

The socket contacts of the several preferred embodiments of the present invention illustrated herein have the advantage that they are all formed from a one-piece integral blank of sheet metal which is formed into a unitary contact having a forward active contact element and a rearward conductor terminating element and a hood which encloses and protects the active contact element. By use of a one-piece blank, a plurality of contacts can be stamped from a continuous strip of sheet material and formed into the required tubular shape. In addition, only the tine portions need be plated for better electrical contact, reducing the cost of plating larger portions of the contact as heretofore was required.

The contact blanks 11 and 71 illustrated herein are initially stamped from a sheet of thin metal such as cadmium copper or beryllium copper. Although only one such blank is shown in each of FIGS. 1 and 16, it will be understood that a plurality of said blanks may be stamped from continuous lengths of the thin sheet metal with the several blanks being interconnected by thin strips or webs of the metal to facilitate the stamping and handling of the blanks in production quantities. Thereafter, the contact blanks are separated from the strips prior to or during the operation performed in making socket contacts from the blanks. Alternatively, the contacts may be left in continuous strips and wound on reels for use with automatic contact terminating machines.

As used herein, including in the appended claims, directional terms such as "forward," "rearward," and the like, refer to the particular position of the blanks and contacts shown in the drawings. It should be understood, however, that this terminology has been employed only for convenience in description, and, in fact, the contact can be made and used in virtually any desired orientation.

It will also be appreciated by those skilled in the art that the socket contacts 10 and 70, illustrated in FIGS. 4 and 20, have hood portions with external surfaces which are relatively smooth and free of any sharp edges. These hood portions facilitate passage of the contact through the restrictive apertures in the rearward sealing grommets of conventional connectors without cutting or tearing the grommet. Specifically, there is no exposed edge that runs longitudinally along the contact which might slice into the grommet during installation or removal.

Of course, it should be understood that various changes and modifications to the preferred embodiments described herein will be apparent to those skilled in the art. Such changes and modifications can be made without departing from the spirit and scope of the present invention and without diminishing its intended advantages. It is, therefore, intended that such changes and modifications be covered by the following claims.

I claim:

1. An elongated electrical contact formed of a single, integral piece of sheet metal and comprising:

an active element forming an open end at one end of the contact including *cantilevered* radially resilient tine means for electrically engaging a complimentary pin contact;

an integral terminal element forming an open end at the other end of the contact including means for mechanically and electrically engaging an electrical conductor; and an open ended hood means *extending* coaxially about *and continuously around* said active contact element for housing and protecting said active contact element, said hood means including a relatively smooth outer surface free of cutting edges *with substantially all points on the outer surface of said active contact element being contiguous with the inner surface of said hood means.*

2. The electrical contact of claim 1 wherein said active contact element and said terminal element form the opposite ends of an integral tubular liner portion and said hood means comprises a tubular hood portion disposed coaxially over said active contact element and integrally coupled with said liner portion at said one end of the contact.

3. The electrical contact of claim 2 wherein said terminal element comprises a closed crimp barrel and includes a conductor locating tab having a base integrally coupled to said liner portion and a distal end extending radially inwardly therefrom, and said hood portion extends coaxially over said crimp barrel and includes a visual inspection aperture coincident with said locating tab.

4. The electric contact of claim 2 wherein said hood portion also includes an annular, radially outwardly extending shoulder.

5. The electrical contact of claim 2 wherein said tine means comprises at least one cantilevered tine having a base integrally coupled to said liner portion and a distal end extending inwardly therefrom and forwardly toward said one end.

6. The electrical contact of claim 5 wherein said tine means includes two diametrically opposed cantilevered tines.

7. The electrical contact of claim 1 further including a liner portion and wherein said active contact element comprises at least one cantilevered tine integral with and extending from said liner portion forwardly toward said one end, and said hood means comprises a tubular hood portion disposed coaxially over said liner portion and said tine and extending rearwardly from said liner portion toward said other end to thereby form said terminal element.

8. The electrical contact of claim 7 wherein said hood portion is integrally coupled with said liner portion at said one end of the contact.

9. The electrical contact of claim 8 wherein said hood portion is integrally coupled with said liner portion along a longitudinally extending seam intermediate the ends of said contact.

10. A one-piece electrical contact formed of a single, integral piece of sheet metal comprising:

a tubular liner portion;

a tubular hood portion coaxially overlying said liner portion and integrally coupled to said liner portion at a forward pin-receiving end, said portions having an opposite open end for receiving and terminating a wire conductor; and at least one tine;

said liner portion having a slot in which said tine extends inwardly from said liner and forwardly toward said pin-receiving end, and said hood portion having an access aperture coincident with said tine to permit said tine to be displaced inwardly with respect to said liner portion.

11. The one-piece electrical contact of claim 10 wherein said liner portion includes a second tine and wherein said hood portion has a second access aperture coincident with said second tine, said tines being located on opposite sides of said liner portion.

12. The one-piece hooded socket contact of claim 10 wherein said liner portion extends rearwardly beyond the end of said hood portion and includes an open generally U-shaped crimp structure beyond said hood portion to receive said wire conductor.

13. The one-piece electrical contact of claim 10 wherein said liner portion extends the length of said hood portion to provide within said hood portion a closed crimp barrel at said opposite end for receiving said wire conductor.

14. The one-piece electrical contact of claim 13 including a tab stamped in said liner portion and wherein said hood portion has a viewing aperture coincident with said tab, said tab extending inwardly from said liner portion to provide means for locating said wire conductor in said crimp barrel, said viewing aperture permitting visual inspection of said wire conductor in said crimp barrel.

15. A one-piece tubular hooded socket contact formed from a unitary piece of sheet metal and adapted to receive a pin contact at one end and to terminate an electrical conductor at the opposite end, said one-piece contact comprising:

a tubular hood portion having a forward open pin-receiving end and a rearward end including a crimp barrel for receiving said conductor;

a plurality of tines extending forwardly in said tubular hood portion, said tines having a concave cross-sectional configuration for cooperating with said pin contact; and a plurality of longitudinal integral flanges disposed intermediate said ends of the tubular hood portion, each of said flanges integrally coupling one of said tines to said hood portion along a longitudinally extending seam of said contact.

16. An electrical contact formed of a single, integral piece of sheet metal and comprising:

a tubular liner portion having an active contact element at one end including resilient tine means for electrically engaging a complementary pin contact and a terminal element at the opposite end including means for mechanically and electrically engaging an electrical conductor; and hood means for housing and protecting said active contact element, said hood means comprising a tubular hood portion disposed coaxially over said active contact element and integrally coupled with said liner portion at said one end of the contact, said hood portion including a relatively smooth outer surface free of cutting edges, and said hood portion including an access aperture coincident with said tine means of said active contact element.

* * * * *